United States Patent [19]
Goodwin

[11] 3,893,711
[45] July 8, 1975

[54] PICKUP TRUCK BODY AND COUPLER FOR TRAILERS

[76] Inventor: Frank E. Goodwin, 1015 N. 23rd St., Billings, Mont. 59101

[22] Filed: June 6, 1973

[21] Appl. No.: 367,465

[52] U.S. Cl. .......................... 280/423 R; 280/415 B
[51] Int. Cl.² ....................................... B62D 53/06
[58] Field of Search ................... 280/423 R, 415 B; 296/24 R, 23 MC, 35 R

[56] References Cited
UNITED STATES PATENTS

| | | | |
|---|---|---|---|
| 2,504,222 | 4/1950 | Otto | 296/24 R |
| 2,925,286 | 2/1960 | Hodges | 280/423 R X |
| 3,055,677 | 9/1962 | Smith | 280/423 R X |
| 3,068,038 | 12/1962 | Douglass | 296/24 R |
| 3,164,398 | 1/1965 | Lugash | 280/423 R |
| 3,164,399 | 1/1965 | Lugash | 280/423 R |
| 3,390,896 | 7/1968 | Philapy | 280/423 R |
| 3,392,992 | 7/1968 | Baker et al. | 280/423 R |
| 3,719,244 | 3/1973 | Miller et al. | 296/23 MC |
| 3,759,545 | 9/1973 | McKethan | 280/423 R |
| 3,788,673 | 1/1974 | Gloege | 280/423 R |
| 3,811,707 | 5/1974 | Jeambey | 280/423 R |

*Primary Examiner*—Leo Friaglia
*Attorney, Agent, or Firm*—Frederick E. Lange

[57] ABSTRACT

A relatively low truck body for a pickup truck having a swivel type of coupler secured to the truck body for enabling the truck to be coupled to a trailer having a front portion overhanging the truck body, in which the truck body has narrow side panels of a width approximately that of the rear wheel wells so that the overhanging portion of the trailer can be much lower than normal. The rear wheel wells are relatively long and have flat top walls so that the truck body can be used with a pickup chassis having any of various wheel bases without enabling engagement of either rear wheel with the walls of the wheel well. The truck body is designed for mounting upon a truck chassis having longitudinal frame members to which the rear axle is secured and the truck body has a plurality of transverse beams secured to the underside of the truck body and resting upon the longitudinal frame members of the truck chassis, two of such transverse frame members extending under opposite ends of the wheel wells. In addition, the truck body has short longitudinal beams underlying and supporting the inner walls of the wheel wells. The swivel coupling unit may be of the type mounted on and slightly above the level of the wheel wells or may be mounted adjacent the floor, depending upon the type of mating coupler unit with which the trailer is equipped.

7 Claims, 9 Drawing Figures

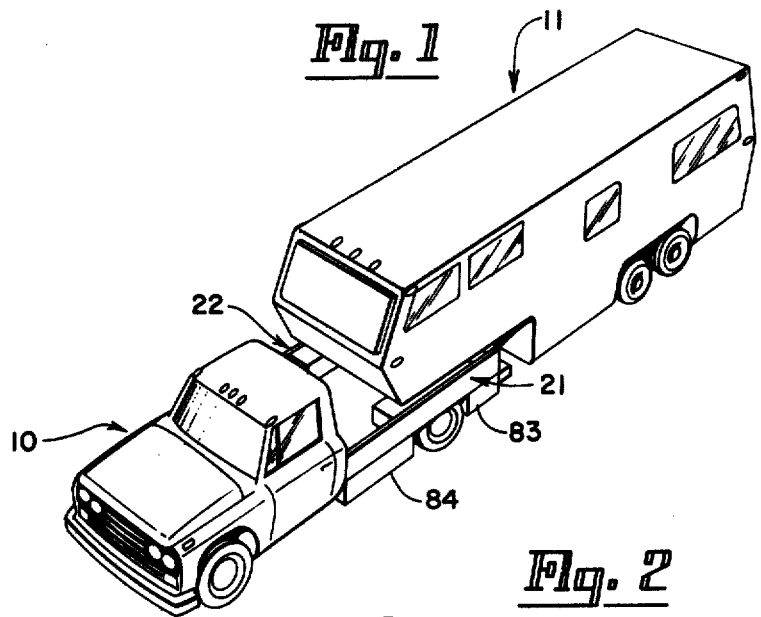
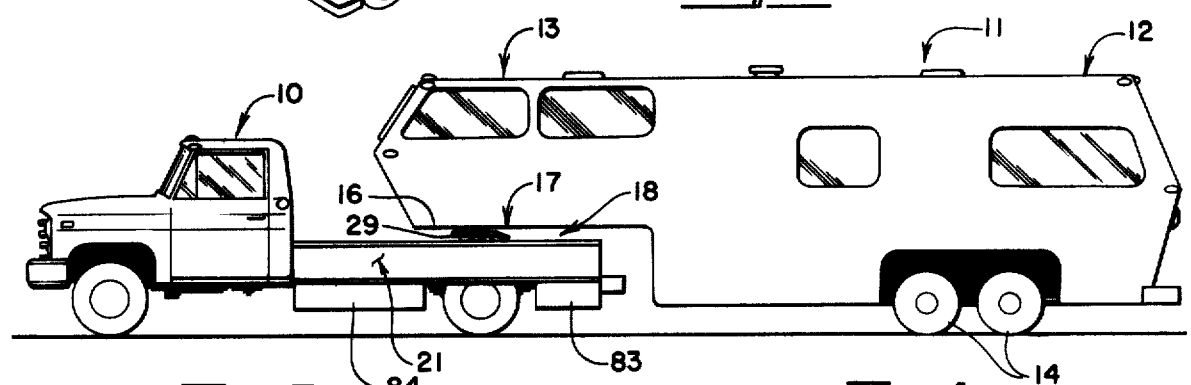
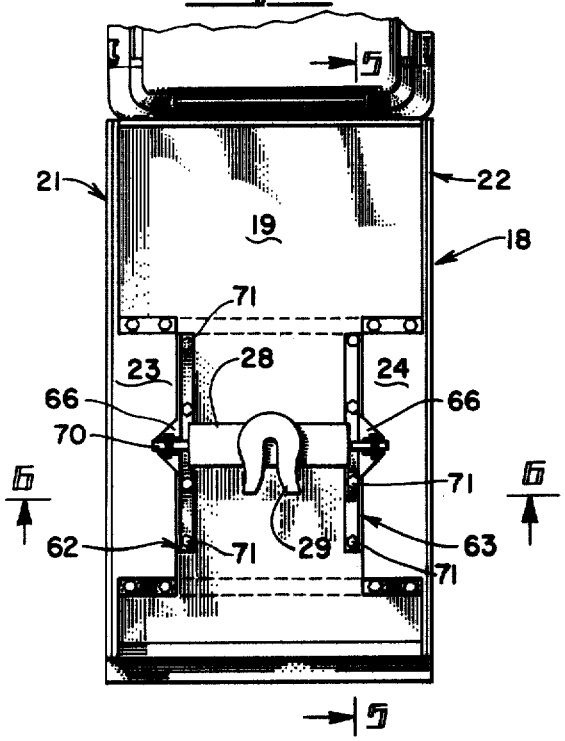
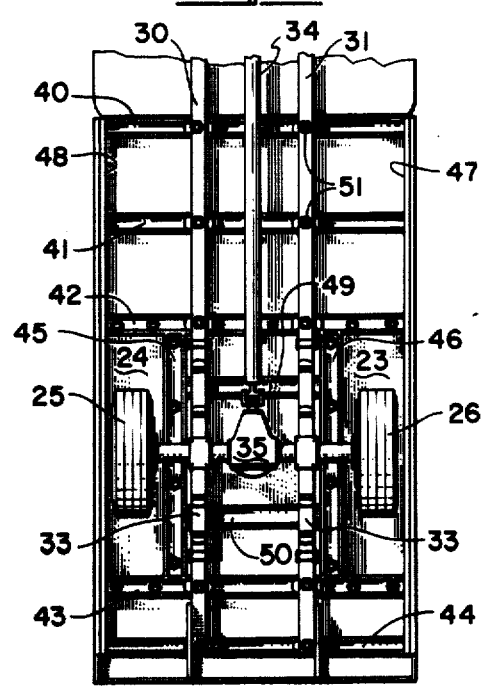

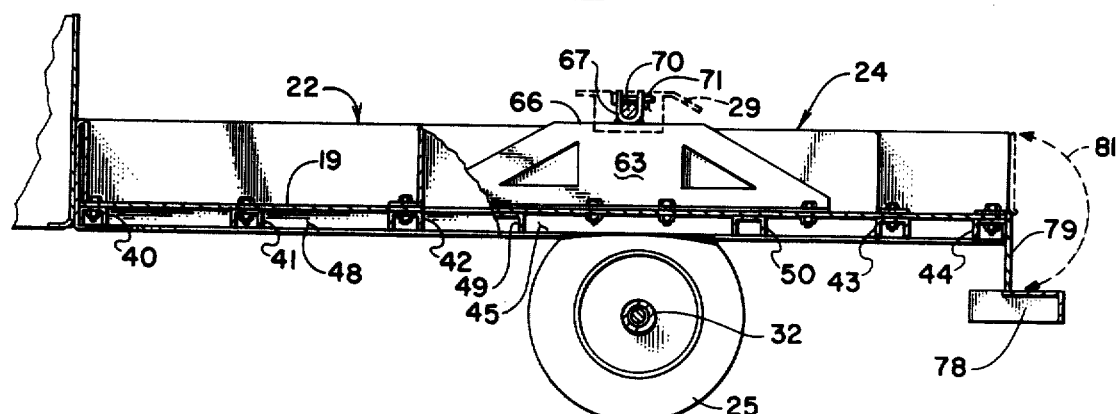
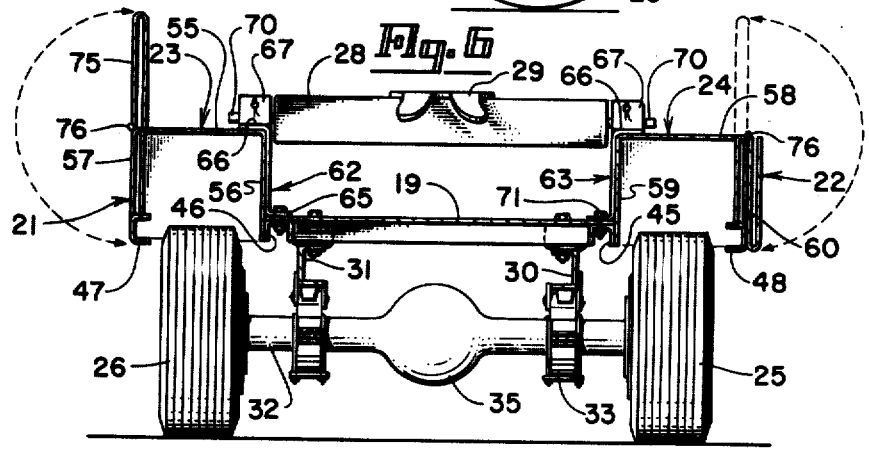
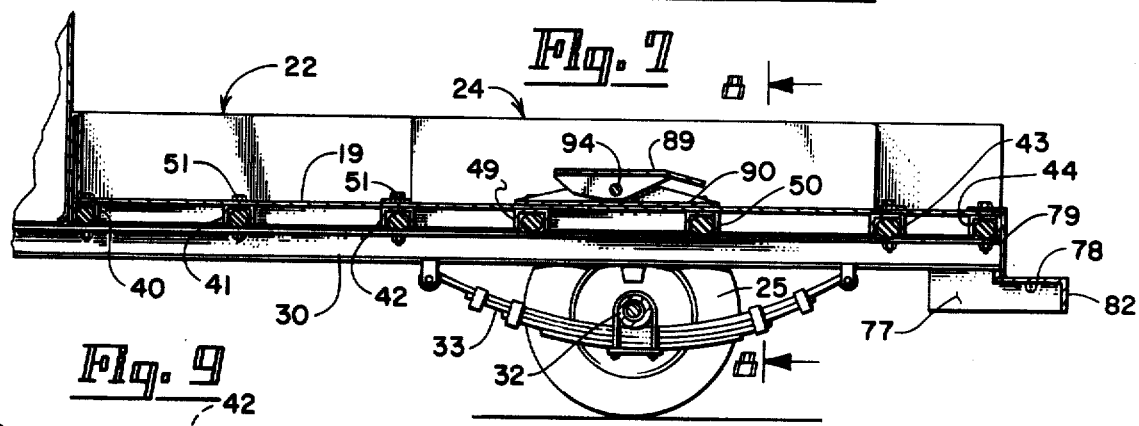
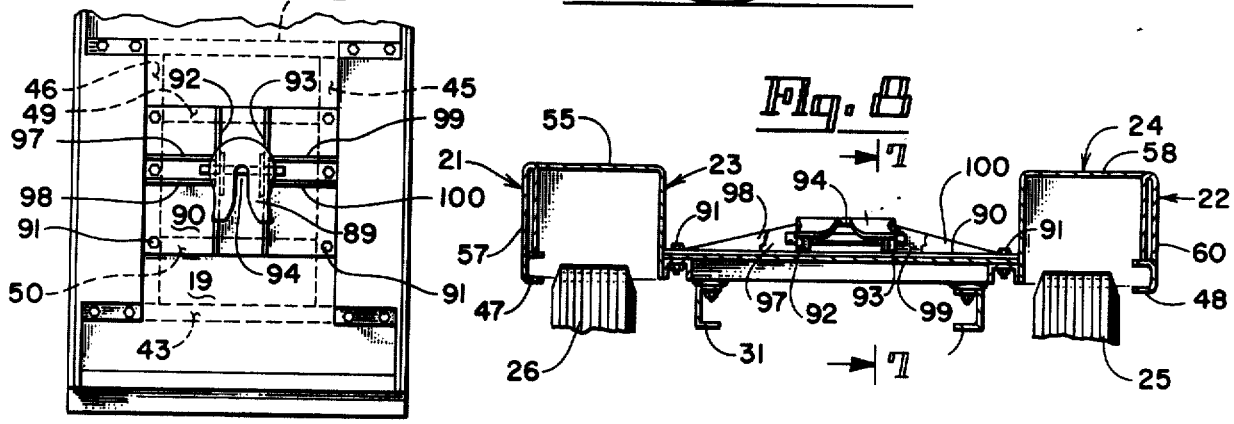

PICKUP TRUCK BODY AND COUPLER FOR TRAILERS

BACKGROUND OF THE INVENTION

One common type of travel trailer is one designed to be coupled to a pickup truck. Such a trailer commonly has an overhanging portion with a swivel coupling unit secured to it and which is designed to mate with a swivel coupling unit secured to the truck body. Since the overhanging portion of the trailer needs to clear the sides of the pickup truck and to allow for a limited amount of vertical swinging movement of the overhanging portion, it is customary for the bottom of the overhanging portion to be relatively high. In order to provide usable space in this overhanging portion, it is accordingly quite common for the roof of this portion of the trailer likewise to be raised with respect to the roof of the remaining portion of the trailer so that there is a definite step up in the portion of the trailer overhanging the pickup truck. This results in raising the center of gravity of the trailer and rendering it less stable.

Furthermore, it is highly imperative that the swivel coupling unit on the pickup truck be supported in such a manner that it is capable of carrying a substantial amount of the weight of the trailer unit. As these trailer units become larger and longer, this is very imperative. Customarily, such trailer units are supported at the rear by one or more pairs of wheels but are supported in front only by the pickup truck. In order to make these pickup trucks usable for other purposes when the trailer is not connected to them, it is customary to provide that the fifth wheel or other swiveling coupling unit be detachably secured. Various complicated arrangements have been developed in an attempt to adequately support the front end of the trailer and still enable the swivel coupling unit to be detachable from the pickup truck.

SUMMARY OF THE PRESENT INVENTION

The present invention is concerned with a relatively low truck body for a pickup truck having a swivel type of coupling secured to the truck body enabling a trailer to be coupled thereto in which the truck body is specially provided with narrow side panels of a height approximately that of the rear wheels so that the overhanging portion of the trailer can be much lower than normal. Because of this special design of the truck body to permit a trailer having a relatively low overhanging portion to be coupled thereto, it is desirable to make one truck body usable with pickup trucks having any of various wheel bases. This is accomplished by providing wheel wells having a length at least one and one-half times the diameter of a typical rear wheel and tire, the tops of the wheel wells being relatively flat for a substantial portion of their length. This makes it possible to mount the truck body on truck chassis having various wheel bases without running the risk of the wheel engaging the top or end walls of the well. Because the well is relatively flat at the top, its overall height remains relatively small to keep the maximum height of the truck as low as possible.

The truck body is provided with a plurality of transverse beams secured to its underside, these transverse beams resting upon the normal longitudinal beams of the truck chassis. Preferably, two of the transverse beams are disposed under the opposite ends of the wheel wells to support the same. I also find it desirable to employ two short longitudinal beams extending between the two transverse beams just referred to, these longitudinal beams lying under the inner edges of the wheel wells and lying under the swivel coupling unit supporting means. In addition, it is desirable to provide two short transverse means extending between and secured to the short longitudinal beams and extending under the swivel coupling unit support. Thus, the swivel coupling unit is firmly supported on the truck body.

The swivel coupling unit may be a fifth wheel which may be supported upon a bar extending across the truck body which bar is detachably secured in brackets extending adjacent the inner walls of the wheel wells. Or it may be a swivel coupling secured to a plate mounted on the floor of the truck bed. The type of coupling unit employed depends upon the coupling unit with which the trailer overhanging portion of the trailer is equipped. In either case, the coupling unit can be readily removable so as to utilize the truck for other purposes.

While the truck, with the fifth wheel support removed, provides adequate hauling space for most purposes, I contemplate providing side extension pieces which are normally disposed adjacent the sides of the truck body but which can be swung up to a position in which they lie in the same plane as the normal truck sides so as to substantially increase the carrying capacity of the truck to that of a normal pickup truck in which the sides extend substantially above the wheel wells.

Various other features of the invention will be apparent from the accompanying specification, claims and drawing.

BRIEF DESCRIPTION OF THE DRAWING

FIG. 1 is a perspective view of a pickup truck and a trailer employing the features of my invention;

FIG. 2 is a side elevational view of the same truck and trailer combination shown in FIG. 1, FIG. 2 being on a slightly larger scale than FIG. 1;

FIG. 3 is a top plan view of the truck body of my invention with certain hidden portions being shown in dotted lines;

FIG. 4 is a bottom plan view of the underside of the truck bed of my invention and the truck chassis on which the truck bed is mounted;

FIG. 5 is a vertical sectional view, the section being taken along the line 5—5 of FIG. 3 and with certain portions broken away;

FIG. 6 is a vertical sectional view of the truck body and truck to which it is attached, the section being taken along the line 6—6 of FIG. 3;

FIG. 7 is a sectional view of a modified form of my invention, the section being taken along the line 7—7 of FIG. 8;

FIG. 8 is a vertical sectional view of the modification of FIG. 7, the section being taken along the line 8—8 of FIG. 7; and FIG. 9 is a top plan view of a portion of the truck bed showing the modification of FIG. 7.

DESCRIPTION OF THE PREFERRED EMBODIMENT

Referring to FIGS. 1 and 2, the truck is designated by the numeral 10 and the trailer by the numeral 11. The trailer is shown as having a rear main portion 12 and a front portion 13 which overhangs the truck bed. The trailer is supported at its rear by at least one pair of wheels 14 and at its front by its connection with the truck. Secured to the underside 16 of the overhanging portion 13 of the trailer is the coupling unit which constitutes part of a swivel connection 17 between the trailer 11 and the truck 10.

My invention involves the provision of a novel truck bed 18 which is secured to the chassis of a conventional pickup truck. As will be pointed out later, the design of my truck bed enables it to be secured to truck chassis having various wheel bases.

Referring to the construction of the truck body 18, this body has a floor panel 19 and a pair of side walls 21 and 22. As will be pointed out later, these side walls 21 and 22 may consist of a plurality of separate panels. Secured to the floor panel 19 are a pair of wheel wells 23 and 24. These wheel wells accommodate the two rear wheels 25 and 26, respectively, of the truck cab. Extending between the two wheel wells 23 and 24 is a fifth wheel support 28 to which is secured a fifth wheel 29, as will be described in more detail later.

The truck chassis is provided with two longitudinal beams 30 and 31 which extend for the full length of the truck chassis. The rear axle housing 32 supports the two beams 30 and 31 through springs 33, as best shown in FIG. 7 in connection with the modification of that figure. The springs 33 are also shown in the bottom plan view of FIG. 4. The rear axles within the axle housing 32 are driven by a drive shaft 34 connected to the rear axle through a differential 35 to drive the two rear wheels 25 and 26.

The floor panel 19 of the truck bed is supported by a plurality of transverse beams 40, 41, 42, 43 and 44 which extend the full width of the truck body. The transverse beams 42 and 43, as best shown in FIG. 5, extend under end flanges of the wheel wells 23 and 24 to aid in supporting these wheel wells. Extending between the transverse beams 42 and 43 are a pair of short longitudinal beams 45 and 46 which are secured at their ends to beams 42 and 43 as by welding. As will be explained later, the inner walls of the wheel wells 23 and 24 are supported from these short longitudinal beams. The transverse beams 41, 42, 43 and 44 are all secured to a pair of longitudinal beams 47 and 48 which constitute the outer edges of the frame of the truck body. All of the beams previously mentioned, including beams 43 and 44, are of channel construction as best shown in FIG. 6. It will be appreciated that the transverse beams 40 through 44, the longitudinal beams 45 and 46, the transverse beams 49 and 50, and the outer beams 47 and 48 are all rigidly secured together as by welding and constitute a rigid frame of substantial strength which is supported upon the transverse beams 30 and 31, being secured thereto by any suitable detachable fastening means such as bolts 51. The framework provided by these beams provides a flat rigid support for the floor panel 19, the wheel wells 23 and 24, and the support for the fifth wheel.

Referring now to the construction of the wheel wells 23 and 24, and specifically to the construction of wheel well 23, it will be noted from FIG. 6 that this comprises a top panel 55 which is integral with inner side panel 56. The top panel 55 and side panel 56 are preferably formed from a single sheet of metal as by bending. The top panel 55 is welded to outer panel 57 which constitutes part of the outer wall 21 of the truck body. In fact, as will be pointed out, this outer panel 57 can constitute the entire outer wall. The outer wall 57 is formed of a single sheet of metal which is bent at its point and doubled back on itself to form a U-type of construction with the bend of the U at the upper end of the panel. The outer panel 57 is secured to the outer beam 47 in any suitable manner. It must be seen that the top panel 55, the inner side panel 56, and the outer panel 57 collectively form a wheel well U-shaped in cross section. The wheel well 24 similarly has a top panel 58 and an integral inner panel 59, the top panel 58 being secured as by welding to an outer truck panel 60. The outer truck panel 60 rests upon the beam 48. The inner panel 56 of wheel well 23 and the inner panel 59 of wheel well 24 are secured to beams 46 and 45 respectively, by welding so that these beams 45 and 46 act to support the inner walls of the wheel wells.

Referring now to FIGS. 3, 4 and 5, it will be noted that the wheel wells 23 and 24 have a relatively flat top for their entire length. It will also be noted that the wheel wells have a length twice that of the outer diameter of the wheels 25 and 26 including the tires thereon. It will also be noted that the wheel wells 24 extend upwardly substantially less than in the conventional truck. I have found that even though the top walls 55 and 58 of the wheel wells 23 and 24 are substantially lower than in the conventional truck, there is still adequate provision between the top of the rear wheels 25 and 26 and the top walls to allow for relative movement of the truck body with respect to the wheels as the truck is driven over rough roads.

Because of the relatively long length of the wheel wells 23 and 24, it is possible to mount the truck body on truck chassis having various wheel bases. For example, if one looks at FIG. 5, it will be noted that even though wheel 25 is substantially ahead or to the rear of the position shown, it would still be clearly within the wheel well with sufficient spacing so as to avoid any accidental contact between the wheel and the walls of the wheel well as the truck body moves up and down with respect to the wheels. Furthermore, because the tops of the wheel wells are relatively flat, the tops of the wheel wells are relatively low throughout their entire distance. If an attempt were made to provide a wheel well as long as the wheel wells 23 and 24 and to employ an arcuate top as is commonly the case with wheel wells, it would be obvious that the top of the wheel well would be relatively high. Because of the long wheel wells with their flat tops, the truck body of the present invention is usable on trucks of various wheel lengths so that it is unnecessary for the dealer to carry a large number of truck bodies of different lengths. While I have shown the wheel wells 23 and 24 as having a length at least twice that of the wheels 25 and 26, it is to be understood that many of the advantages of the present invention could be obtained if these wheel wells were only one and one-half times as large.

The fifth wheel support 28 is supported in the truck bed by a pair of bracket members 62 and 63. As is clear from FIG. 5, each of these truck brackets has a triangular vertical wall which rests snugly against the inner wall of the wheel well. As indicated in connection with bracket 62, there is a lower inturned flange 65 which rests upon the beam 46. Suitable fastening means such as bolts 71 serve to hold the flange 65, the floor panel 19 and the beam 46 rigidly together. The upper portion of each of the brackets 62 and 63 terminates in a horizontally disposed short triangular flange 66 as best shown in FIG. 3. The flange overhangs the top wall of the associated wheel well, which acts to further support the bracket 62. Secured to the triangular horizontal flanges 66 are U-shaped members 67, which may be welded to the horizontal flanges 66. The fifth wheel support 28 is in the form of a bar which extends between the two brackets 62 and 63 and has secured in its outer ends journal pins 70 which fit between the legs of members 67. Pins 71 extend through apertures at the top of the legs of members 67 to retain the pins 70 in position. It is to be understood that suitable means, such as cotter pins, can be employed for retaining the pins 70 against withdrawal. By reason of the mounting provided by the two U-shaped members 67 and the journal pins 70, the fifth wheel 29 may rock as the longitudinal axis of the trailer tilts with respect to that of the truck due to changes in elevation of the road.

It will be noted that because of the construction employed, the fifth wheel support 29 is very adequately supported. In the first place, the brackets 62 are supported by the short longitudinal beams 45 and 46, between which are secured the transverse beams 49 and 50 which also aid in supporting the brackets. Furthermore, the flanges 66 of the brackets 62 and 63 overlie the top walls of the wheel wells so that they are supported by the wheel wells directly. The wheel wells in turn are supported at the ends by the beams 42 and 43 upon which they rest and to which they are secured. The inner walls of the wells are supported by the short longitudinal beams 45 and 46. The outer walls are supported by the longitudinal beams 47 and 48. Thus, the wheel wells are securely supported on all four sides.

It will be noted from FIGS. 3 and 5 that the length of the brackets 62 and 63 is somewhat less than the distance between the opposite ends of the wheel well. This permits the brackets to be adjusted longitudinally with respect to the frame where there are substantial differences in the length of the wheel base. It is desirable, where possible, to have the fifth wheel mounted a few inches ahead of the rear axle 32. By having the length of the brackets 62 and 63 shorter than that of the wheel wells, it is possible by removing the bolts 71 to shift the position of the brackets longitudinally so that the fifth wheel is disposed just ahead of the rear wheel axles despite a difference in wheel length of the truck chassis to which the truck body is attached.

While it is possible for the side panels 57 and 60 to act as the sides 21 and 22 of the truck bed, it is occasionally desirable to have more carrying capacity than is possible with the relatively low sides provided by panels 57 and 60. As has been pointed out, the sides do not extend above the top of the wheel wells in order to make it possible to lower base 16 of the overhanging portion 13 of the trailer. For this reason, I find it desirable in some cases to provide auxiliary panels 75 which are hinged at 76 to the tops of the panels 57 and 60. As indicated by dotted lines in FIG. 6, these panels can be swung from a position in which they overlie the panels 57 and 60 to positions in which they for a vertical continuation of the panels. In FIG. 6, I have shown one of these panels 75 as raised upward to a position in which it forms a vertical continuation of side wall 21 whereas the other panel (on the right-hand side) overlies the normal side panel 60. It is, of course, to be understood that any suitable means can be provided for locking the panels 75 in either their raised or lowered position.

Secured to the frame members 47 and 48 are two L-shaped brackets 77. Each of these brackets has a rearwardly extending portion 78. Secured to each of these portions is a rear step plate 82 which is supported by the horizontally extending portion 78 and which is bent to provide a downwardly extending portion to cover the space in the rear between the two brackets 77. In addition, there is a panel 79 which extends vertically between the side beams 47 and 48 and encloses the rear of the truck body beneath the floor 19. If desired, as indicated by dotted lines 81 in FIG. 5, an end gate can be provided which will be hinged at the top of panel 79 and can be swung vertically upwardly to close the rear of the truck body.

Despite the low height of the top of the truck body, it is still possible to have cabinets beneath the floor of the truck body. In FIGS. 1 and 2, such cabinets are designated by the numerals 83 and 84. It will, of course, be appreciated that these cabinets will be provided with outer doors that can be swung to open position to permit access to the interior of the cabinets.

MODIFICATION OF FIGS. 7 THROUGH 9

The modification of FIGS. 7 through 9 differs from that of FIGS. 1 through 6 primarily in the fact that the coupling unit 89 is mounted adjacent the floor. Certain trailers have a pedestal extending downwardly a substantial distance with the intention that the coupling unit is located adjacent the floor of the pickup truck. In such case, the fifth wheel support is mounted adjacent the floor. In the arrangement of FIGS. 7, 8 and 9, it is in the form of a plate 90 to which upwardly extending ears 92 and 93 are secured. The fifth wheel is secured to ears 92 and 93 by means of a pin 94 which passes through the ears 92 and 93 and ears which are secured to the underside of the fifth wheel. The ears 92 and 93 are maintained in a vertical position by triangular brackets 97, 98, 99 and 100 which are welded to the plate 90 and to the upstanding ears 92 and 93.

It will be noted from FIGS. 7 and 9 that the plate 90 overlies the short transverse beams 49 and 50 and the short longitudinal beams 45 and 46 so that it is supported by all four of these beams. It may be detachably secured to the longitudinal beams 45 and 46 by some fastening means such as bolts 91. The resulting structure causes the fifth wheel support to be firmly supported. By reason of the pin 94, the fifth wheel can rock back and forth as with the preferred species, as the longitudinal axis of the trailer tilts with respect to the longitudinal axis of the truck. As with the preferred species, the fifth wheel is supported by both the short longitudinal beams 45 and 46 and the short transverse beams 49 and 50. It will likewise be noted that as with the species of FIGS. 1 to 6, the sides 21 and 22 do not extend above the tops of the wheel wells which, as with the other species, are also relatively flat and low throughout their entire length. As with the preferred species, the wheel wells 23 and 24 are relatively long so as to permit the truck bed to be mounted on truck chassis having various wheel bases.

In conclusion, it will be seen that I have provided a truck body which is designed to be secured to trailers having a portion overhanging the truck body, the truck body being sufficiently low as to permit lowering the overhanging portion of the trailer. Furthermore, I accomplish this with a very stable construction. In addition, by reason of the novel construction employed, the truck bed can be used with truck chassis having various wheel bases. Furthermore, I have provided a truck body which, despite its reduced height, is very rigid and provides a very firm support for the pivotal mount for the trailer.

While I have shown certain specific embodiments for purposes of illustration, it is to be understood that the scope of the invention is to be determined solely by the appended claims.

I claim as my invention:

1. The combination of a truck and a recreational trailer having a forward portion overhanging the body of the truck and swivelly secured to the truck body, said truck having longitudinal frame members, a rear axle secured thereto, and a truck body;

said truck body having a floor extending the full length of said truck body, a pair of enclosed wheel wells extending above the floor and into which the rear wheels of the truck can extend, and two narrow side body panels of a height above said floor substantially equal to that of said wheel wells so that the side panels of said truck body do not extend appreciably above the tops of said wheel wells, the tops of each of said wheel wells being relatively flat for a substantial portion of its length, said wheel wells extending lengthwise for only a portion of the length of said truck body, a plurality of transverse beams secured to the underside of said truck body beneath said floor and resting upon said longitudinal frame members of the truck, a first swivel coupling unit, a support for said first swivel coupling unit, means for supporting said coupling unit support above said floor between said wheel wells from at least two of said transverse beams, said truck body providing a cargo carrying space above said floor between said side panels which extends the full length of said truck body and which cargo carrying space is relatively unobstructed except for the relatively short region occupied by said wheel wells, said first swivel coupling unit, and the supporting means therefor, and said trailer having a forward portion overhanging the body of the truck and a second swivel coupling unit extending downwardly from said forward portion and swivelly coupled to said first swivel coupling unit to support said forward portion in a vertical position in which the bottom of said forward portion is as close to the tops of said wheel wells as it is to the tops of said side panels.

2. The combination of claim 1 in which the first swivel coupling unit is a fifth wheel and in which there are a pair of brackets detachably supporting the support for the fifth wheel, each of said brackets being adjacent to the inner wall of one of said wheel wells and having a flange portion overlying the top of the wheel well.

3. A relatively low truck body for a pickup truck, said body having a swivel type of coupler secured thereto for enabling the pickup truck to be swivelly coupled to a trailer having a portion with a relatively low bottom overhanging said truck body, said truck body further being designed for mounting upon the chassis of a pickup truck having longitudinal frame members to which the rear axle is secured, said truck body having a pair of enclosed wheel wells into which the rear wheels of the truck can extend and two narrow side body panels of a height substantially equal to that of said wheel wells so that the side panels of said truck body do not extend appreciably above the tops of said wheel wells, said wheel wells having a length at least one and a half times the diameter of a typical rear wheel and tire of such a pickup truck and the top of each of said wheel wells being relatively flat for a substantial portion of its length so that the truck body can be used with a pickup chassis having any one of various wheel bases without causing engagement of either rear wheel with the ends or top wall of its associated wheel well, a plurality of transverse beams secured to the underside of said truck body and adapted to rest upon the longitudinal frame members of such a pickup truck and support the truck body thereon, two of said transverse beams being at opposite ends of said wheel wells and supporting the ends thereof, two short longitudinal beams each extending between and secured at their opposite ends to said two transverse beams, each of said short longitudinal beams underlying and supporting the inner wall of one of said wheel wells, a swivel coupling unit adapted to mate with a swivel coupling unit extending downwardly from the forward portion of a trailer, a support for said swivel coupling unit, and means for supporting said coupling unit support adjacent said wheel wells from at least two of said transverse beams.

4. The truck body of claim 3 in which the swivel coupling unit is a fifth wheel, in which there are a pair of brackets, each of which is disposed adjacent to the inner wall of one of said wheel wells with a lower flange resting upon one of said short longitudinal beams and an upper flange overlying said wheel well, and in which the fifth wheel support is a bar journalled at its opposite ends on the upper flanges of said brackets.

5. The truck body of claim 3 in which the swivel coupling unit is adjacent the floor of said truck body and in which the coupling unit support comprises a flat rectangular plate supported at two opposite ends by said transverse beams at opposite ends of the wheel wells and at its other opposite ends by said short longitudinal beams.

6. A relatively low truck body for a pickup truck, said body having a swivel type of coupler secured thereto for enabling the pickup truck to be swivelly coupled to a trailer having a portion with a relatively low bottom overhanging said truck body, said truck body further being designed for mounting upon the chassis of a pickup truck having longitudinal frame members to which the rear axle is secured, said truck body having a pair of enclosed wheel wells into which the rear wheels of the truck can extend and two narrow side body panels of a height substantially equal to that of said wheel wells so that the side panels of said truck body do not extend appreciably above the tops of said wheel wells, said wheel wells having a length at least one and a half times the diameter of a typical rear wheel and tire of such a pickup truck and the top of each of said wheel wells being relatively flat for a substantial portion of its length so that the truck body can be used with a pickup chassis having any one of various wheel bases without causing engagement of either rear wheel with the ends or top wall of its associated wheel well, a plurality of transverse beams secured to the underside of said truck body and adapted to rest upon the longitudinal frame members of such a pickup truck and support the truck body thereon, a swivel coupling unit adjacent the floor of said truck body and adapted to mate with a swivel coupling unit extending downwardly from the forward portion of a trailer, a support for said swivel coupling unit extending transversely of said truck body approximately midway of the length of said wheel wells, and means for supporting said coupling unit support from at least two of said transverse beams adjacent said wheel wells.

7. A relatively low truck body for a pickup truck, said body having a swivel type of coupler secured thereto for enabling the pickup truck to be swivelly coupled to a trailer having a portion with a relatively low bottom overhanging said truck body, said truck body further being designed for mounting upon the chassis of a pickup truck having longitudinal frame members to which the rear axle is secured, said truck body having a pair of enclosed wheel wells into which the rear wheels of the truck can extend and two narrow side body panels of a height substantially equal to that of said wheel wells so that the side panels of said truck body do not extend appreciably above the tops of said wheel wells, said wheel wells having a length at least one and a half times the diameter of a typical rear wheel and tire of such a pickup truck and the top of each of said wheel wells being relatively flat for a substantial portion of its length so that the truck body can be used with a pickup chassis having any one of various wheel bases without causing engagement of either rear wheel with the ends or top wall of its associated wheel well, said truck body having a pair of supplemental side panels each pivotally supported adjacent the upper edge of one of the side body panels of said truck body, said supplemental panels normally being disposed so that they overlap and are coextensive with the side body panels but are swingable, when no trailer is to be secured to the truck body, to positions in which they form vertical extensions of the side body panels and form with the latter, side walls for the truck body extending substantially above the wheel wells, a plurality of transverse beams secured to the underside of said truck body and adapted to rest upon the longitudinal frame members of such a pickup truck and support the truck body thereon, a swivel coupling unit adapted to mate with a swivel coupling unit extending downwardly from the forward portion of a trailer, a support for said swivel coupling unit, and means for supporting said coupling unit support from at least two of said transverse beams adjacent said wheel wells.

* * * * *